July 2, 1968  R. S. VOSE  3,391,028
FUEL CELL AND METHOD OF PRODUCING ELECTRICITY
Filed May 1, 1963  2 Sheets-Sheet 1

INVENTOR.
RICHARD S. VOSE
BY
ATTORNEYS

United States Patent Office 3,391,028
Patented July 2, 1968

3,391,028
FUEL CELL AND METHOD OF PRODUCING ELECTRICITY
Richard S. Vose, 821 Penn Center House, 1900 John F. Kennedy Blvd., Philadelphia, Pa. 19103
Filed May 1, 1963, Ser. No. 277,329
2 Claims. (Cl. 136—86)

This invention relates to a fuel cell and a method of producing electricity.

A fuel cell, as is well known to the art, directly converts chemical energy of a fuel into electrical energy. It is well known to operate fuel cells employing gaseous oxidants or reductants and both oxidants and reductants and the fuel cell and method of this invention employ such gaseous inputs. In a typical fuel cell, a pair of spaced gas permeable electrodes, each of which is a conductor and each of which will permit the passage of a gas introduced thereto, are connected by an electrolyte. Means are provided to introduce a fuel gas to one of the electrodes and an oxidant such as air or oxygen to the other electrode. Such fuel cells have had a restricted practical applicability due to polarization effects at the electrode and excessive voltage drops under conditions of large current flow.

In accordance with this invention, the above objections have been markedly reduced by supplying the gases to the electrodes with alternating pulses of pressure which in turn alternately exposes the electrodes respectively to contact, for example, with the gaseous fuel and electrolyte and with oxygen and the electrolyte.

The invention will be better understood from a reading of the following description in conjunction with the drawings, in which.

Figure 1:
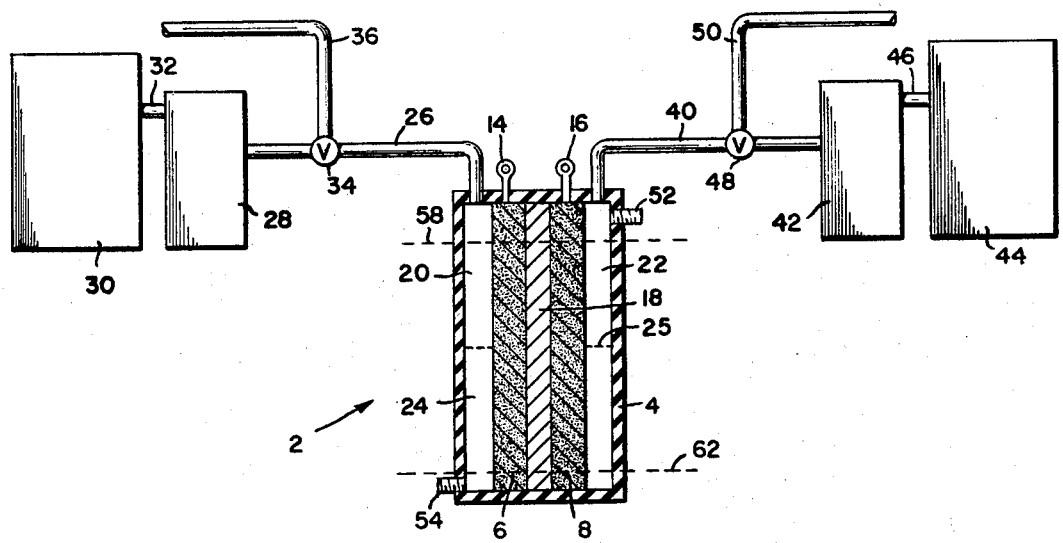
FIGURE 1 is a schematic view of a fuel cell in accordance with the invention.

Referring to FIGURE 1, a fuel cell 2 having a rectangular casing 4 of a type usually employed in batteries such as rubber or glass contains a negative electrode 6 (anode) and a positive electrode 8 (cathode). A lead 14 is connected to electrode 6 and a lead 16 is connected to electrode 8. Electrodes 6 and 8 are gas and liquid permeable.

A membrane (diaphragm) 18 is placed between electrodes 6 and 8. Membrane 18 is gas impermeable and liquid permeable. Adjacent electrode 6 there is provided a fluid chamber 20 and adjacent electrode 8 is provided a fluid chamber 22. A liquid electrolyte 24 is contained in fuel cell 2 up to a level indicated at 25, this level of electrolyte being maintained in chambers 20 and 22, in electrodes 6 and 8 and in membrane 18. A pipe 26 connects chamber 20 to a compressor 28 which in turn is connected to a low pressure source of gaseous fuel indicated at 30 by a pipe 32. Pipe 26 contains a two-way valve 34 to which is also connected a pipe 36. Valve 34 is employed to connect the section of pipe 26 adjacent to chamber 20 either to compressor 28 or to line 36.

Chamber 22 is connected to a pipe 40 which in turn is connected to a compressor 42 which is connected to a low pressure source of an oxidant by pipe 46. Pipe 40 contains a two-way valve 48 to which is connected a pipe 50. Valve 48 is employed to connect the portion of pipe 40 adjacent chamber 22 either to compressor 42 or to pipe 50. Plugs 52 and 54 are provided for adding and removing liquid respectively.

The gas and liquid permeable electrodes 6 and 8 are well known to the fuel cell art and hence need not be described in detail. Reference may be had to "Catalysis, Inorganic and Organic," Berkman, Morrel & Egloff, Reinhold Publishing Co., New York (1940) for typical suitable electrodes. Generally the electrodes are made from metals of group VIII of the Periodic Table, such as rhodium, palladium, iridium and platinum. In addition, they may be made from, for example, nickel, copper, platinum or palladium black which is deposited on a base metal such as stainless steel, iron, nickel and the like, metal oxide, or carbon activated with platinum or palladium. They may be in the form of screens, meshes or other types of porous bodies. The thickness of the electrode is not critical, but they will preferably be from 1 mm. to 16 mm. The electrodes will have a minimum capillary radius of in excess of from 0.006 to 2000 microns (one micron equals $10^{-4}$ cm.) and generally in excess of from 0.1 to 10 microns depending on the gas pressure (bubbling pressure) employed so as to permit the passage of gas and electrolyte. The porosity of the electrode (volume of capillaries/total volume, percent) will advantageously be in the range of from about 27% to about 66%.

A wide variety of electrolytes may be employed as is well known to those skilled in the art, typical examples being dilute sulfuric acid, caustic soda solutions, potassium hydroxide solutions, and brine solutions. An aqueous electrolyte is preferred.

The liquid permeable membrane will permit the passage of the liquid electrolyte but block the passage of gas. It is well known that a porous medium can be made so as to be pervious to a liquid but not to a gas. Such membranes will have a maximum capillary radius such that the surface tension of the electrolyte will cause the electrolyte to block the capillary to the passage of a gas at the gas pressure employed. For most practical purposes the maximum capillary radius will be in the range of from 0.006 to 2000 microns and generally will be in the range of from 1.0 to 10 microns. Desirably the porosity (volume of capillaries/total volume, percent) will be in the range of from about 27% to about 66%. Generally the maximum gas pressure (bubbling pressure in pounds per square inch gauge) will be in the range of from about 0.01 to 3500 p.s.i. gauge but as a matter of normal practice will be in the range of from about 2 to about 200 p.s.i. gauge. The proper value for the maximum capillary radius in microns for a given maximum gas pressure can readily be determined from the logarithmic graph shown in FIGURE 3.

The limits of the capillary radii in the membrane and in the electrodes are shown in the graph (FIGURE 3), the gas pressures and capillary radii each being plotted on a logarithmic scale. The line 60 is a plot of the border line capillary radii in the membrane and electrodes for given gas pressures. For a given gas pressure the maximum capillary radius should be less than the plotted point and that of the electrodes more than the plotted point. Thus, when using a gas pressure of 100 p.s.i.g. a capillary radius less than 0.2, for example 0.1, should be used for the membrane and of more than 0.2, for example 0.3, should be used for the electrodes.

Figure 3:
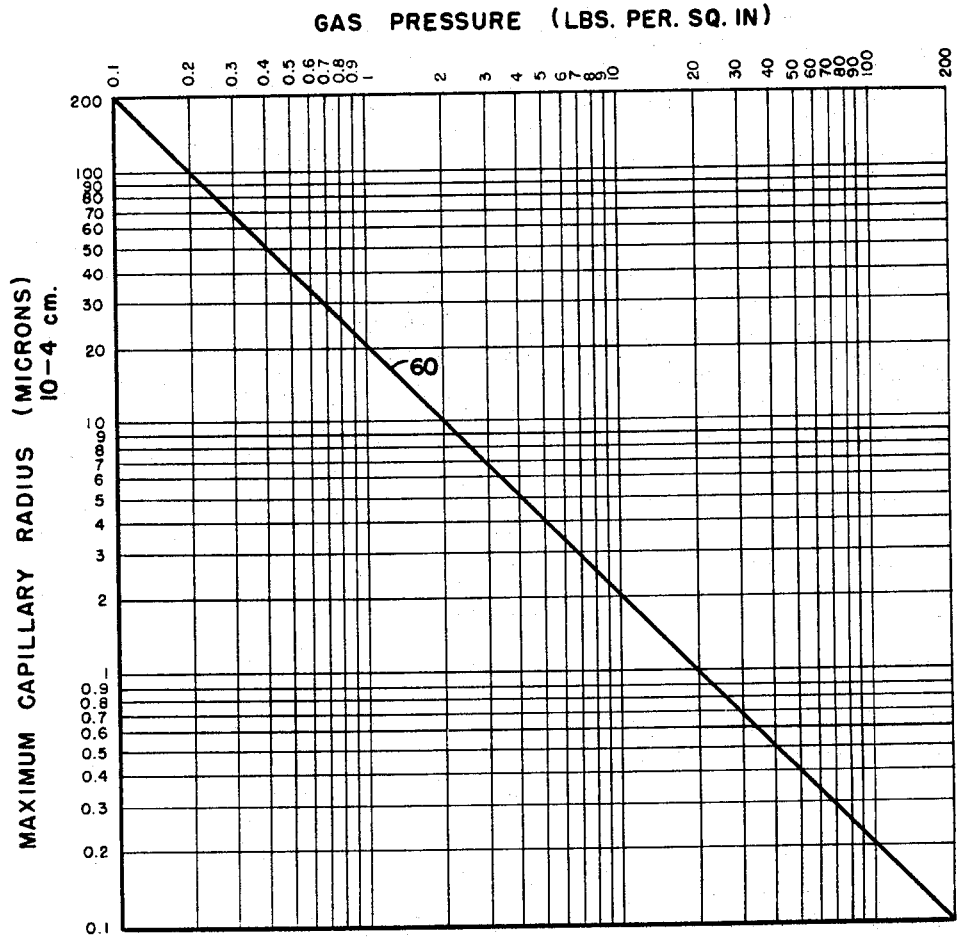
FIGURE 3 is a graph showing the relationship between gas pressure and maximum capillary radius in the diaphragm.

The area above the line represents the practical upper and lower limits of maximum capillary size and of gas pressure. Any point within this area is a condition for an electrode element. The graph of FIGURE 3 shows the ranges within the most widely used operating conditions. It will be obvious that the conditions for higher pressures and smaller capillary sizes can be obtained by extending the graph line and the coordinates.

The number of capillaries in the membrane as well as in the electrodes, that is, within the area below the line as well as in the area above the line, can be calculated from average capillary radius and highest porosity figure. The average capillary radius is one half the maximum capillary radius. The porosity is the percent of capillaries to total volume. Consequently, the limits on the size of the capillaries that are shown in the areas above and below the line 60 also define the limits of the number of capillaries.

Typical exemplary membranes (diaphragms) are made of, for example, porcelain, stoneware and aloxite (aluminum oxide) by first casting and then firing. They may be precision woven or felted from, for example, asbestos. The material of which the membrane is made will, of course, be selected to be passive, i.e. non-reactive under the operating conditions to be employed in the cells.

OPERATION

In the operation of the fuel cell 2, plug 52 is removed and electrolyte is poured into the cell until the cell is full of electrolyte and then drained through plug 54 until half full of electrolyte. All of membrane 18 will be wetted by wicking action. Plug 52 is then replaced. With valves 34 and 48 set to respectively connect chamber 20 to pipe 36 through pipe 26 and chamber 22 to pipe 50 through pipe 40, the compressors 28 and 42 are placed in operation. Valve 34 is then shifted to cause fuel gas under pressure to flow through line 26 into chamber 20. The fuel gas forces liquid electrolyte 24 through membrane 18 into electrode 8 and chamber 22 until the level of electrolyte in chamber 20 is, for example, down to the level indicated by the dotted line 62 and the level of electrolyte in chamber 22 is at the level indicated by the dotted line at 58. This provides first for a thorough permeation of electrode 6 by the fuel gas. Secondly, it provides for a thorough wetting of electrode 8 up to a high level with the liquid electrolyte. Membrane 18 prevents passage of fuel gas therethrough. Both valves 34 and 48 are now switched so as to cause compressor 42 to force an oxidant gas through pipe 40 into chamber 22 and cause the reverse flow of electrolyte 24 until the level of electrolyte in chamber 22 drops to approximately line 62 and the level of electrolyte in chamber 20 rises approximately to the line 58. During this operation fuel gas will be forced out of chamber 20 through pipe 26 into pipe 36. Henceforth, valves 34 and 48 are simultaneously shifted to reverse the flow of electrolyte through membrane 18 incident to the pressure of the fuel gas or the oxidant gas. Generally, it is preferred to reverse the flow of the electrolyte through membrane 18 in the range of from about 20 to 80 times per minute and it is preferred to construct the fuel cell to accommodate the cycling in this range.

The starting level of the electrolyte can be varied to provide for the desired coverage of the electrodes, i.e. the lower the starting level, the lower the level of electrolyte supplied to the electrodes under gas pressure.

The products of the reaction, for example water, are removed from the cell with the exhausting gases. If the gases are to be reused, the products of the reaction will be removed as, for example by drying the gases in the case of water.

Figure 2:
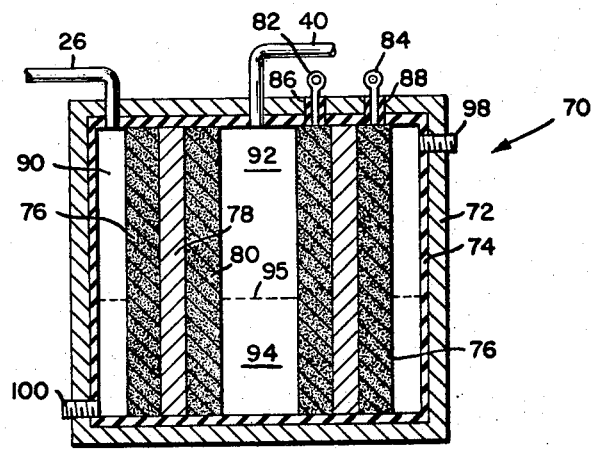
FIGURE 2 is a schematic view of an alternative fuel cell in accordance with the invention.

FIGURE 2 is a schematic view of a fuel cell 70 which is in its basic essentials the same as the fuel cell of FIGURE 1, differing only in employing a cylindrical construction in lieu of a rectangular construction. A cylindrical casing 72 of, for example, steel is lined with battery pitch indicated at 74. A cylindrical negative electrode (anode) 76 is positioned within casing 72 extending from the top to the bottom thereof. Immediately inside electrode 76 is a cylindrical membrane 78 the inside of which abuts against a cylindrical positive electrode (cathode) 80. Electrodes 76 and 80 are gas and liquid permeable while membrane 78 is gas impermeable and liquid permeable. A lead 82 is connected to electrode 80 and a lead 84 is connected to electrode 76, these leads being insulated from the steel casing 72 by insulating leads 86 and 88, respectively. A cylindrical chamber 90 surrounds electrode 76 while the inner periphery of electrode 80 forms a wall for central chamber 92. Fuel cell 70 can be substituted for fuel cell 2 and connected to lines 26 and 40 and their associated apparatus shown in FIGURE 1 with line 26 communicating with chamber 90 and line 40 communicating with chamber 92. A liquid electrolyte 94 is contained in fuel cell 70 up to a level indicated at 95. Plugs 98 and 100 are provided for adding and removing liquid from cell 70, respectively. The operation of fuel cell 70 will be the same as the operation for the fuel cell 2 as described above.

Example I

The primary battery or fuel cell was constructed as illustrated in FIGURE 2. It was a concentric assembly of hollow right circular cylinders having inside diameters and outside diameters of the four cylinders of ¼ inch I.D. and 2 inch O.D. (electrode), 2 inch I.D. and 3 inch O.D. (membrane), 3 inch I.D. and 4 and ½ inch O.D. (electrode), 5 inch I.D. and 5 and ½ inch O.D. (casing). The height of the electrode cylinders and the membrane cylinder was 6 inches. The electrodes were both made of nickel. The membrane was made of aluminum oxide. The casing was made of steel pipe and was 11 inches in height to allow the use of battery pitch to cushion the 6 inch assembly at both top and bottom. The exposed inside surface of the steel pipe between the pitch cushions was coated with a thin layer of battery pitch. Both ends of the steel pipe were closed with blind flange connections. The top blind flange was drilled for connections for fuel gas and oxygen gas, and for electrical connections with soapstone sleeves to insulate the electric leads from the steel cover. A 6 inch glass gage was attached to the steel pipe so as to be able to observe the level and movement of the electrolyte.

The maximum capillary radius and the number of capillaries per square inch of average area of the aluminum oxide membrane were 0.80 micron (radius) and had a porosity of 59%. The pair of nickel electrodes used each had a porosity of 66% and a maximum capillary radius of 1.4 microns. The gas pressure used was 20 pounds per square inch gage.

In the operation of the cell an electrolyte of dilute sulfuric acid was added to the cell until the level gage indicated that the cell was full and then drained until half full. The electrolyte was 1.25 specific gravity. Hydrogen gas at 20 lbs. per sq. in. ga. pressure was introduced into the outer electrode and oxygen gas also at 20 lbs. per sq. in. ga. pressure was introduced into the inner electrode. A voltameter (coulometer) of the silver type was connected to the leads from the cell electrodes. A coulometer is an electrolytic cell arranged for the measurement of a quantity of electricity by the chemical action produced. The unit of the quantity of electricity is the coulomb, and this quantity was measured. A coulomb per second is an ampere. A voltmeter was also connected across the leads of the cell.

The cell was then operated with the use of pulses of pressure applied alternately to the gas at the electrodes. The hydrogen gas fuel at the anode was brought to 20 lbs. pressure and held there for two seconds. A discharge line for the hydrogen was then opened and simultaneously the oxygen gas at the cathode was brought to 20 lbs. pressure and held there for two seconds. A discharge line for the oxygen was then opened and simultaneously the hydrogen gas was again brought to 20 lbs. pressure and held there for two seconds. The alternating pulses of gas pressure were continued during the operation of the cell.

The above described pulsation operation of the fuel cell was continuously repeated. The quantity of electricity generated by the cell was 8 coulombs per second. This output of 8 amperes of current was obtained at 1.0 volt. Thus, the cell yielded a power operating characteristic of 32 amperes/square foot at voltage of 1.0. After three hours of operation the usual polarization had not occurred because of the applying of pulses of pressure to alternate electrodes. The pulsation of pressure also effectively overcame any great concentration changes occurring in the electrolyte. A third advantage of the use of pulsation operation was that the contact of gases and electrodes was improved. The electrodes were kept free of any film of liquid so that the solution of gas was not hindered. The electromotive force (EMF) or voltage of the cell did not fall, as it usually does, rapidly. The final results showed also that the current had not fallen.

Example II

In a second test, using the apparatus and procedure of Example I, natural gas was used as the gaseous reductant and oxygen gas as the gaseous oxidant. The electrolyte used was a molal solution of 56.1 grams of potassium hydroxide per 1000 grams of water. After one and one half hours of operation, the usual polarization, concentration changes in the electrolyte, and hindrance of the solution of gas had not occurred because the pulsation of pressure had effectively overcome them. The quantity of electricity generated by the cell was 6.5 coulombs per second. This output of 6.5 ampers of current was obtained at 1.15 volts. Thus, the cell yielded a power operating characteristic of 26 amperes/square foot at voltage of 1.15.

What is claimed is:

1. The method of producing electricity in a fuel cell having an oxidizer electrode chamber and a fuel electrode chamber, a gas conduit connected to the upper portion of the oxidizer electrode chamber, a gas conduit connected to the upper portion of the fuel electrode chamber, a separator forming a wall between said chambers, said separator being gas impermeable and liquid permeable, an oxidizer electrode in the oxidizer electrode chamber, a fuel electrode in the fuel electrode chamber, liquid inlet means and liquid outlet means; comprising permeating the separator with electrolyte, partially filling the oxidizer electrode and fuel electrode chambers with electrolyte, introducing under pressure a reducing gas into the fuel electrode chamber while exhausting gas from the oxidizer electrode chamber to supply a reducing gas to the fuel electrode and to cause electrolyte to flow from the fuel electrode chamber to the oxidizer electrode chamber through the separator to lower the electrolyte level in the fuel electrode chamber to a level short of the bottom of the fuel electrode and raise the electrolyte level in the oxidizer electrode chamber to a level short of the top of the oxidizer electrode, then introducing under pressure an oxidizing gas into the oxidizer electrode chamber while exhausting gas from the fuel electrode chamber to supply an oxidizing gas to the oxidizer electrode and to cause electrolyte to flow from the oxidizer electrode chamber to the fuel electrode chamber through the separator to lower the electrolyte level in the oxidizer electrode chamber to a level short of the bottom of the oxidizer electrode and raise the electrolyte level in the fuel electrode chamber to a level short of the top of the fuel electrode and continuously repeating the steps of introducing the reducing and oxidizing gases.

2. The method of claim 1 in which the electrodes are permeable to both gas and liquid and coextensive with the separator.

References Cited

UNITED STATES PATENTS

| 668,838 | 2/1901 | Lavison | 136—86.2 |
| 3,115,427 | 12/1963 | Rightmire | 136—86 |
| 3,126,302 | 3/1964 | Drushella | 136—86 |
| 3,177,097 | 4/1965 | Beals | 136—86 |
| 963,852 | 7/1910 | Benko. | |
| 2,156,693 | 5/1939 | Jacobson | 136—86 X |
| 3,222,223 | 12/1965 | Platner | 136—86 |
| 3,223,556 | 12/1965 | Cohn et al. | 136—86 |

WINSTON A. DOUGLAS, *Primary Examiner.*

B. OHLENDORF, H. FEELEY, *Assistant Examiners.*